US009167321B2

(12) United States Patent
Chen

(10) Patent No.: US 9,167,321 B2
(45) Date of Patent: Oct. 20, 2015

(54) OPTICAL ROUTER AND TERMINAL DEVICES THEREWITH BASED ON DYNAMIC WAVELENGTH ASSIGNMENT

(71) Applicant: INDUSTRIAL TECHNOLOGY RESEARCH INSTITUTE, Hsinchu (TW)

(72) Inventor: Hsing-Yu Chen, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 35 days.

(21) Appl. No.: 14/261,038

(22) Filed: Apr. 24, 2014

(65) Prior Publication Data
US 2015/0189408 A1 Jul. 2, 2015

(30) Foreign Application Priority Data

Dec. 27, 2013 (TW) .............................. 102148856 U

(51) Int. Cl.
*H04J 14/00* (2006.01)
*H04Q 11/00* (2006.01)
*H04J 14/02* (2006.01)

(52) U.S. Cl.
CPC ........ *H04Q 11/0005* (2013.01); *H04J 14/0212* (2013.01); *H04Q 11/0066* (2013.01); *H04Q 2011/0022* (2013.01); *H04Q 2011/0086* (2013.01)

(58) Field of Classification Search
CPC .......... H04Q 11/0005; H04Q 11/0066; H04Q 2011/0022; H04Q 2011/0086; H04J 14/0212; H04J 14/02; H04J 14/022; H04J 14/0227; H04B 10/506; H04B 10/505
USPC .............. 398/49, 45, 48, 79, 69, 82, 183, 186
See application file for complete search history.

(56) References Cited

U.S. PATENT DOCUMENTS 5,353,145 A * 10/1994 Le Coquil et al. ............... 398/49
5,488,501 A * 1/1996 Barnsley .......................... 398/51
(Continued)

FOREIGN PATENT DOCUMENTS

CN   101621723 A   1/2010
TW     419167 U    1/2001
(Continued)

OTHER PUBLICATIONS

TW Office Action dated Mar. 25, 2015 as received in Application No. 102148856.
(Continued)

*Primary Examiner* — Hibret Woldekidan
(74) *Attorney, Agent, or Firm* — Maschoff Brennan

(57) ABSTRACT

Disclosed herein is an optical router based on dynamic wavelength assignment, for receiving data signals and an aggregate control signal from servers, and comprising a modulation module and a wavelength selection module, which comprises a multi-wavelength light source for generating an input carrier having wavelengths, and a carrier processing unit for separating the input carrier into carriers and for guiding the carriers to the modulating units based on the aggregate control signal. The modulation module comprises an optical coupler and modulating units in one-to-one correspondence with the servers. Each modulating unit is adapted for receiving the data signal from the corresponding server and for modulating the received carrier into an optical signal based on the data signal. The optical coupler is adapted for aggregating the optical signals into an aggregate optical signal.

17 Claims, 3 Drawing Sheets

(56) References Cited

U.S. PATENT DOCUMENTS

| | | | |
|---|---|---|---|
| 5,923,683 A | 7/1999 | Morioka et al. | |
| 6,404,522 B1* | 6/2002 | Handelman | 398/79 |
| 6,603,781 B1* | 8/2003 | Stinson et al. | 372/23 |
| 6,865,348 B2 | 3/2005 | Miyamoto et al. | |
| 7,177,542 B2 | 2/2007 | Zami | |
| 7,292,784 B2 | 11/2007 | Lee et al. | |
| 7,676,155 B2 | 3/2010 | Cho et al. | |
| 7,809,278 B2* | 10/2010 | Morris et al. | 398/156 |
| 8,457,165 B2 | 6/2013 | Liu et al. | |
| 8,472,805 B2 | 6/2013 | Lam et al. | |
| 8,682,164 B2* | 3/2014 | Tien et al. | 398/72 |
| 2002/0196493 A1* | 12/2002 | Marom | 359/127 |
| 2004/0120715 A1* | 6/2004 | Shin et al. | 398/91 |
| 2005/0141077 A1* | 6/2005 | Kim et al. | 359/333 |
| 2005/0286903 A1* | 12/2005 | Jennen et al. | 398/140 |
| 2010/0142942 A1* | 6/2010 | Rhee et al. | 398/25 |
| 2011/0292953 A1 | 12/2011 | Liu et al. | |
| 2012/0087666 A1 | 4/2012 | Kwon et al. | |
| 2013/0343760 A1* | 12/2013 | Chen et al. | 398/91 |

FOREIGN PATENT DOCUMENTS

| | | |
|---|---|---|
| TW | 201138353 A | 11/2011 |
| WO | 2004/036794 A1 | 4/2004 |

OTHER PUBLICATIONS

Analysis of a Dynamically Wavelength-Routed Optical Burst Switched Network Architecture, Düser and Bayvel, Journal of Lightwave Technology, vol. 20, No. 4, Apr. 2002.

Wavelength Locking a Fast-Switching Tunable Laser, Simsarian and Zhang, IEEE Photonics Technology Letters, vol. 16, No. 7, Jul. 2004.

Dynamic Channel Allocation Experiment in DWDM Millimeter-wave Radio-on-Fiber Access Network, Olmos et al., Optical Communication (ECOC), 2007 33rd European Conference and Exhibition, Sep. 2007.

Hybrid WDM/TDM PON Using the AWG FSR and Featuring Centralized Light Generation and Dynamic Bandwidth Allocation, Bock et al., Journal of Lightwave Technology, vol. 23, No. 12, Dec. 2005.

Investigation of Improvement of Dynamic Switching Operation for Wavelength Switch With Super-Structure-Grating (SSG)-DBR-LD, Delayed-Interference Signal-Wavelength Converter (DISC), and Bandpass Filter, Mori et al., Journal of Lightwave Technology, vol. 28, No. 23, Dec. 1, 2010.

Scalable Optical Switches With Large Port Count Based on a Waveguide Grating Router and Passive Couplers, Joe and Solgaard, IEEE Photonics Technology Letters, vol. 20, No. 7, Apr. 1, 2008.

* cited by examiner

Back-to-back 25-km apart

OPTICAL ROUTER AND TERMINAL DEVICES THEREWITH BASED ON DYNAMIC WAVELENGTH ASSIGNMENT

CROSS-REFERENCE TO RELATED APPLICATIONS

This non-provisional application claims priority under 35 U.S.C. §119(a) on Patent Application No. 102148856 filed in Taiwan, R.O.C. on Dec. 27, 2013, the entire contents of which are hereby incorporated by reference.

TECHNICAL FIELD

The present disclosure relates to an optical router and terminal devices therewith based on dynamic wavelength assignment, particularly to a device supporting signal transmission in data centers.

BACKGROUND

Many data centers, relying on coaxial infrastructure, are burdened and unable to keep up with the growing thirst for bandwidth posed by the multimedia and cloud services of the Internet, and by telecommunication in general. In place of traditional cables, optical fiber has become the primary and most researched transmission medium, be it long-distance or last-mile, for its compactness, low attenuation, high capacity, and immunity to electromagnetic interference.

Wavelength-division multiplexing is widely adopted in the optical communication industry to increase the per-fiber transmission rate and reduce material cost by aggregating signals of several wavelengths onto a single fiber. A wavelength-division multiplexer requires light of a given wavelength as input, often from a tunable laser, which is expensive considering the temperature and wavelength control modules attached to it.

SUMMARY

In light of the above, the present disclosure provides an optical router based on dynamic wavelength assignment (DWA) and terminal devices with DWA-based optical routing.

The optical router provided by this disclosure is adapted for receiving a plurality of data signals and an aggregate control signal from a plurality of servers. It comprises a modulation module and a wavelength selection module. The modulation module comprises an optical coupler and a plurality of modulating units in one-to-one correspondence with the servers. The wavelength selection module comprises a multi-wavelength light source for generating an input carrier, and a carrier processing unit for separating the input carrier into a plurality of carriers and for guiding the carriers corresponding to the servers to the corresponding modulating units based on the aggregate control signal. The input carrier has a plurality of wavelengths which may be different from one another, and each of the carriers has one of the wavelengths. Each of the modulating units is adapted for receiving the data signal from the corresponding server and for modulating the carrier guided hither into an optical signal based on the received data signal. The optical coupler is adapted for aggregating the optical signals into an aggregate optical signal.

One of the terminal devices provided by this disclosure comprises a plurality of servers and an aforementioned optical router. Each of the servers is adapted for generating an individual control signal and a data signal, whereas the individual control signals form an aggregate control signal.

Another one of the terminal devices provided by this disclosure comprises a plurality of serving modules, a guiding module, and a wavelength selection module. Each serving module comprises a reflective modulator and a server adapted for generating an individual control signal and a data signal. The individual control signals form an aggregate control signal. The guiding module comprises an optical coupler and a plurality of optical circulators in one-to-one correspondence with the serving modules. The wavelength selection module comprises a multi-wavelength light source for generating an input carrier, and a carrier processing unit for separating the input carrier into a plurality of carriers and for guiding the carriers corresponding to the servers to the corresponding optical circulators based on the aggregate control signal. The input carrier has a plurality of wavelengths, and each of the carriers has one of the wavelengths. Each of the optical circulators has a first port, a second port, and a third port. The first port is adapted for receiving the carrier from the carrier processing unit and for guiding the carrier to the reflective modulator through the second port. The reflective modulator is activated upon receiving the carrier and, once activated, adapted for modulating the received carrier into an optical signal based on the data signal. The second port is adapted for guiding the optical signal to the optical coupler through the third port. The optical coupler is adapted for aggregating the optical signals into an aggregate optical signal.

BRIEF DESCRIPTION OF THE DRAWING

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
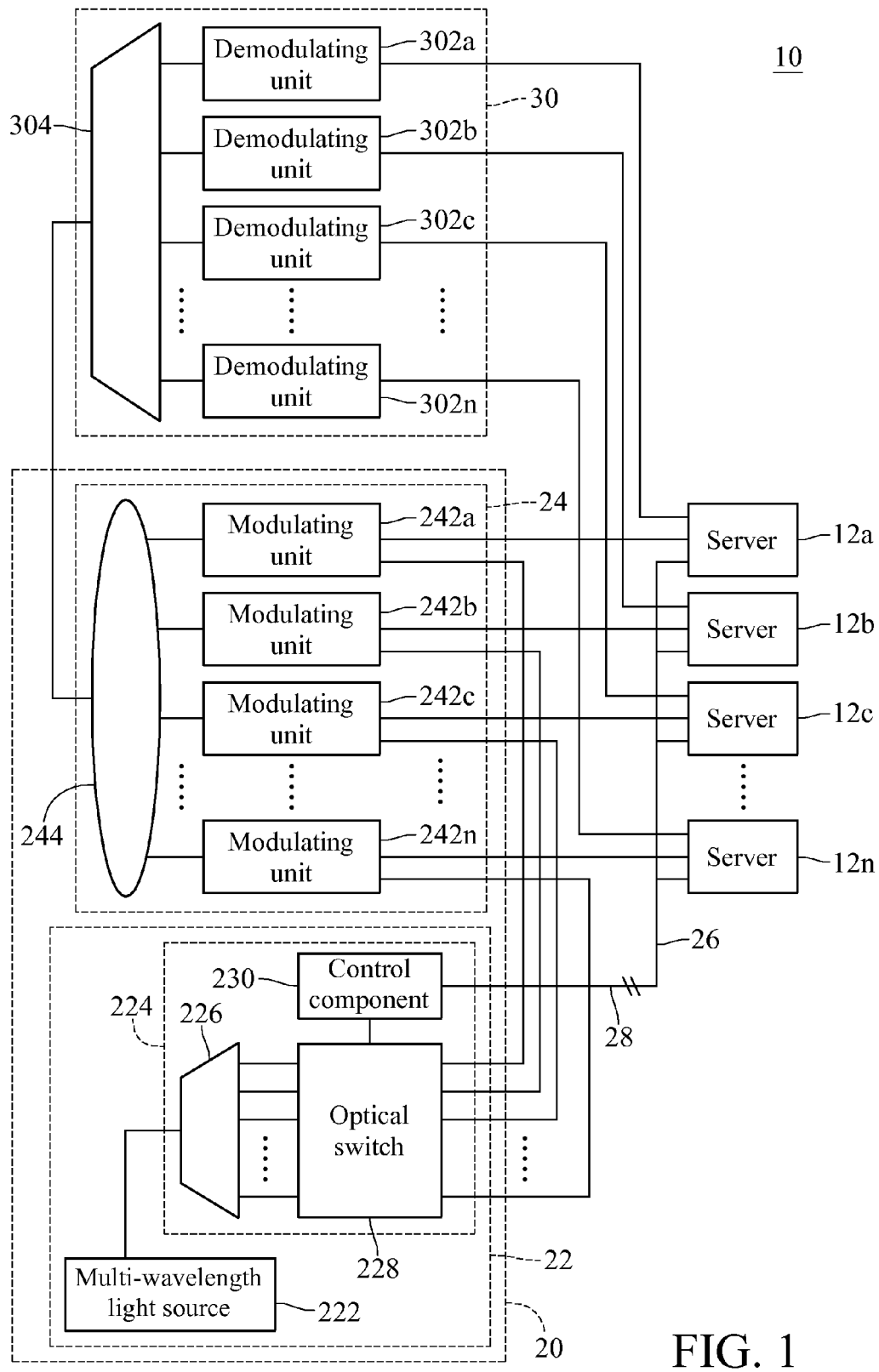
FIGS. 1 and 2 are each architectural diagrams of a terminal device with DWA-based optical routing, in accordance with various embodiments of the present disclosure.

Please refer to FIG. 1, where a terminal device 10 with optical routing based on dynamic wavelength assignment (DWA) is shown. The terminal device 10 comprises a plurality of servers 12a, 12b, 12c, through 12n, a modulation module 24, and a wavelength selection module 22. Each of the servers 12a, 12b, 12c, through 12n is adapted for generating a data signal for the modulation module 24 and an individual control signal 26 for the wavelength selection module 22. The individual control signals 26 may be combined into an aggregate control signal 28 or respectively sent to the wavelength selection module 22. Upon reception of and based on the aggregate control signal 28, the wavelength selection module 22 is adapted for guiding the (optical) carriers for the corresponding servers 12a, 12b, 12c, through 12n to the modulation module 24, which modulates the received carriers into optical signals based on the received data signals and aggregates the optical signals.

The server 12a, 12b, 12c ..., or 12n may be in practice any serving apparatus managing data signals, such as a top-of-rack switch.

The terminal device 10 further comprises a receiving apparatus 30 for separating the aggregate optical signal back to the optical signals, for demodulating the separated optical signals into the data signals, and for transmitting the demodulated data signals to the corresponding servers 12a, 12b, 12c, through 12n based on the wavelengths of the optical signals.

The modulation module 24 and the wavelength selection module 22 are part of a DWA-based optical router 20 disposed in between the servers 12a, 12b, 12c, through 12n, adapted for converting the (electrical) data signals into the optical signals, and for combining the optical signals into the multi-wavelength aggregate optical signal.

The modulation module 24 comprises an optical coupler 244 and a plurality of modulating units 242a, 242b, 242c, through 242n in one-to-one correspondence with the servers 12a, 12b, 12c, through 12n. Each of the modulating units 242a, 242b, 242c, through 242n is adapted for receiving a data signal from the corresponding server 12a, 12b, 12c ..., or 12n. As shown in the example of FIG. 1, the modulating unit 242a corresponds to and receives the data signal from the server 12a, the modulating unit 242b corresponds to and receives the data signal from the server 12b, the modulating unit 242c corresponds to and receives the data signal from the server 12c, and so on.

The wavelength selection module 22 comprises a carrier processing unit 224 and multi-wavelength light source 222 for generating an (optical) input carrier having a plurality of wavelengths. In practice, the multi-wavelength light source 222 may be a supercontinuum, an optical comb, a Fabry-Perot laser diode, or some other capable device. The carrier processing unit 224 separates the input carrier into the said carriers and guides the carriers for the corresponding servers 12a, 12b, 12c, through 12n to the corresponding modulating units 242a, 242b, 242c, through 242n. Each carrier has one of the said wavelengths, and each modulating unit 242a, 242b, 242c ..., or 242n is adapted for modulating the received carrier into an optical signal based on the received data signal. As an example, suppose that the server 12a decides to send the n-th server 12n a data signal and therefore transmits an individual control signal 26 based on the receiving wavelength λn of the server 12n. (The fixed receiving wavelength of the server 12a is λa, that of the server 12b λb, that of the server 12c λc, and so on.) This individual control signal 26 is sent to the carrier processing unit 224 as part of the aggregate control signal 28. Per this request of the server 12a, the carrier processing unit 224 guides the carrier for the server 12n into the modulating unit 242a, which modulates the data signal and the carrier of wavelength λn into an optical signal. The optical coupler 244 in turn aggregates the optical signals from the modulating units 242a, 242b, 242c, through 242n. The wavelengths of the separated single-wavelength carriers, i.e. λa, λb, λc, through λn, are different from one another.

The carrier processing unit 224 comprises a wavelength-division demultiplexer 226, an optical switch 228, and a control component 230. The optical switch 228 is adapted for guiding the carriers corresponding to the servers 12a, 12b, 12c, through 12n to the corresponding modulating units 242a, 242b, 242c, through 242n based on the aggregate control signal 28 received by the control component 230. In the previous example, the individual control signal 26, as part of the aggregate control signal 28, is transmitted from the server 12a to the control component 230, which adjusts a light path within the optical switch 228 to guide the λn carrier for the n-th server 12n to the modulating unit 242a for modulation with the data signal.

The aggregate control signal 28 received by the control component 230 is transmitted by a central control component (not shown) in the switching system when the system architecture of the terminal device 10 is partially optical. When the terminal device 10 is all-optical, the control component 230 is the central control component, and the aggregate control signal 28 is received from a signal aggregating component (not shown). The control component 230 may alternatively receive each individual control signal 26 separately.

In practice, the wavelength-division demultiplexer 226 may be an arrayed waveguide grating, and the optical switch 228 may be a wavelength selective switch, an optical microelectromechanical system (MEMS), or some other component capable of guiding the carriers.

The modulating units 242a, 242b, 242c, through 242n may be external or reflective modulators. An external modulator may be in practice a Mach-Zehnder modulator, a modulator based on electro-absorption, or some other component capable of modulating data signals into optical signals using a carrier.

The receiving apparatus 30 comprises a wavelength-division demultiplexer 304 and a plurality of demodulating units 302a, 302b, 302c, through 302n in one-to-one correspondence with the servers 12a, 12b, 12c, through 12n. As shown in FIG. 1, the demodulating unit 302a corresponds and sends the data signal to the server 12a, the demodulating unit 302b corresponds and sends to the server 12b, the demodulating unit 302c corresponds and sends to the server 12c, and so on. The wavelength-division demultiplexer 304 is adapted for separating the aggregate optical signal into the optical signals as modulated by the modulating units 242a, 242b, 242c, through 242n. The demodulating units 302a, 302b, 302c, through 302n are adapted for demodulating the separated optical signals back to the data signals, and for transmitting the demodulated data signals to the corresponding servers 12a, 12b, 12c, through 12n based on the wavelengths of the optical signals. In the previous example, the data signal from the server 12a and intended for the server 12n is modulated with the carrier of wavelength λn by the modulating unit 242a into an optical signal, which is transmitted as part of the aggregate optical signal put together by the optical coupler 244 and reappears at the output of the wavelength-division demultiplexer 304. Every outgoing port of the wavelength-division demultiplexer 304 is for a fixed wavelength; therefore, this optical signal, having the receiving wavelength of the server 12n, is sent to the demodulating unit 302n, where it is demodulated back to the data signal, completing the data transmission from the server 12a to the server 12n.

To reiterate the system architecture of the terminal device 10, suppose that the server 12a wants to send a data signal to the server 12n, and so does the server 12b to the server 12c. The servers 12a generates an individual control signal 26 based on the receiving wavelength λn of the server 12n, and the server 12b generates another based on that of the server 12c, λc. The individual control signals 26 are aggregated and sent to the carrier processing unit 224, whose control component 230 adjusts light paths within the optical switch 228 to guide the λn and λc carriers to the modulating units 242a and 242b, respectively. The modulating unit 242a modulates its received carrier with the data signal from the server 12a into an optical signal; the modulating unit 242b modulates its received carrier with the data signal from the server 12b into another optical signal. The optical coupler 244 combines the optical signals into an aggregate optical signal, which is sent to the wavelength-division demultiplexer 304 for separation. The demodulating unit 302n transforms the separated optical signal it receives into the data signal from the server 12a; likewise the demodulating unit 302c reproduces the data signal from the server 12b. The data transmissions are completed when both the servers 12n and 12c receive the data signals intended for them respectively.

Figure 2:
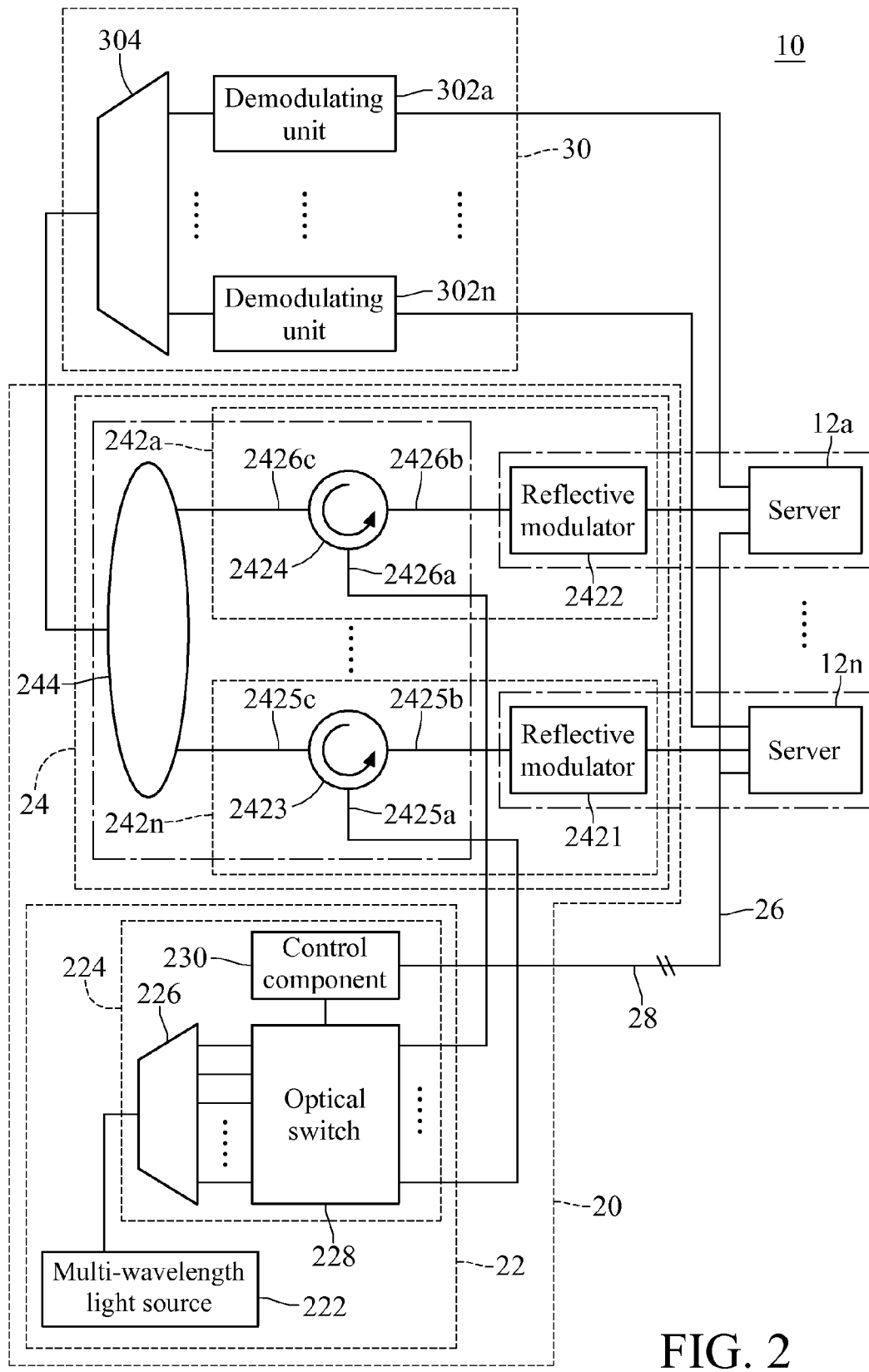

Please refer to FIG. 2 for another embodiment of the modulation module 24. The modulating unit 242a, for instance, comprises a reflective modulator 2422 and an optical circulator 2424 having a first port 2426a, a second port 2426b, and a third port 2426c. The first port 2426a is adapted for receiving a carrier from the carrier processing unit 224 and guiding that carrier to the reflective modulator 2422 through the second port 2426b. Consider again the example where the server 12a decides to send the server 12n a data signal. Per the request of the server 12a in the form of an individual control signal 26, the control component 230 adjusts the optical switch 228 to guide the carrier for the server 12n to the first port 2426a. The reflective modulator 2422, activated by the carrier from the second port 2426b, modulates the carrier into an optical signal based on the received data signal. The optical signal is guided through the second port 2426b to the third port 2426c and thence output to the optical coupler 244.

Please note that in FIG. 2 the reflective modulators of the modulating units 242a, 242b, 242c, through 242n may form serving modules with the servers 12a, 12b, 12c, through 12n, as indicated by the encircling chain lines. For example, the reflective modulator 2422 of the modulating unit 242a can be paired with the server 12a, and the reflective modulator 2421 of the modulating unit 242n with the server 12n. Furthermore, the optical circulators of the modulating units 242a, 242b, 242c, through 242n, including the optical circulators 2423 and 2424, may form a guiding module with the optical coupler 244.

A said serving module is adapted for transmitting an individual control signal 26 using the included server to the wavelength selection module 22 as part of the aggregate control signal 28. The serving module with the server 12a, for instance, can cause the wavelength selection module 22 to guide the carrier for the corresponding server 12a, 12b, 12c . . ., or 12n to the first port 2426a of the optical circulator 2424. The first port 2426a guides the carrier through the second port 2426b to and thus activates the reflective modulator 2422, which modulates the received carrier into an optical signal based on the data signal from the server 12a. The optical signal is guided through the second port 2426b to the third port 2426c and thence output to the optical coupler 244.

Figure 3A:
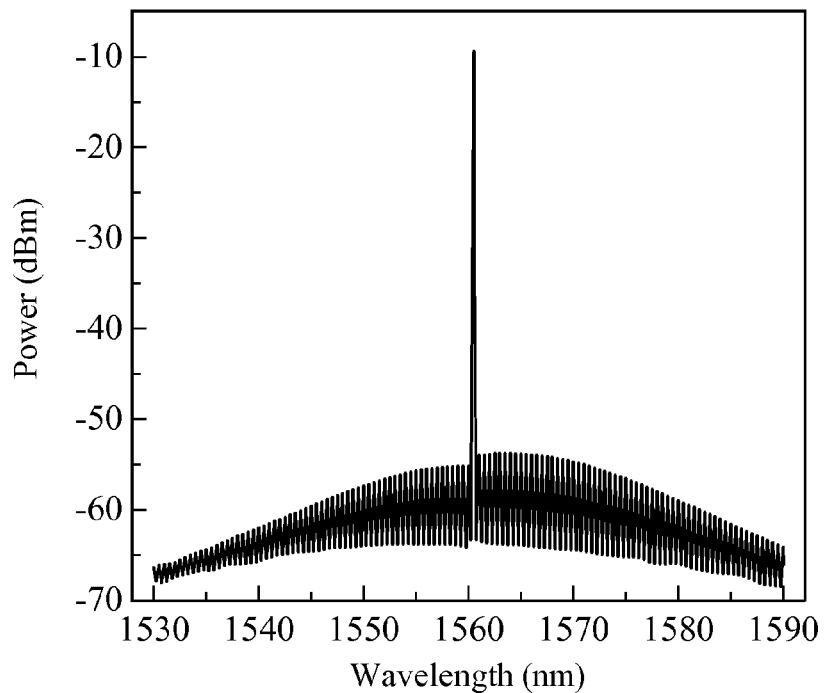
FIG. 3a is the power spectrum of a reflective modulator, in accordance with an embodiment of the present disclosure.

Please refer to FIG. 3a with regard to FIG. 2. As shown in the plot, when activated with a 1560.7-nm carrier from the multi-wavelength light source 222, the reflective modulator 2421 responds with a power spectrum peaking at the same wavelength. The power difference between the peak and the rest of the spectrum is about 50 dBm, signifying that reflected and modulated carrier can hardly be interfered.

Figure 3B:
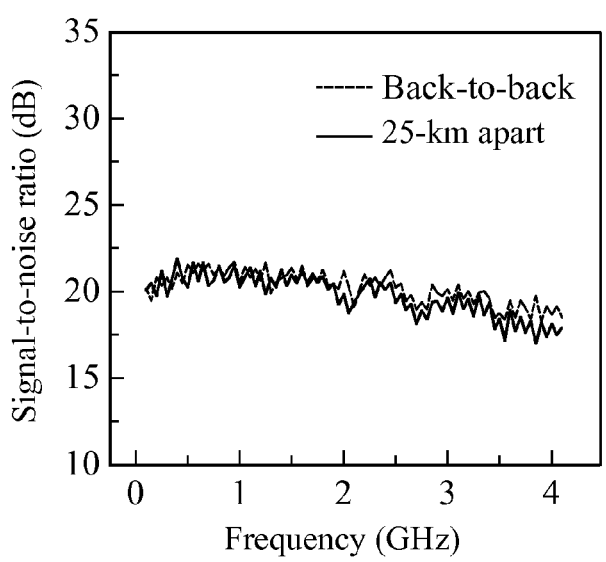
FIG. 3b illustrates the signal-to-noise ratio of a reflective modulator and an optical circulator coupled back-to-back or 25-kilometer apart, in accordance with an embodiment of the present disclosure.

Please refer to FIG. 3b with regard to FIG. 2. As shown in the plot, the signal-to-noise ratio of the reflective modulator 2421 and the optical circulator 2423 remains around 20 dB at frequencies between 0 and 4 GHz whether they are coupled back-to-back or 25-kilometer apart, signifying that the optical signal travelling between them is not affected by noise because of either kind of connection.

Figure 3C:
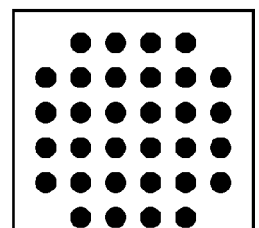
FIGS. 3c and 3d illustrate the quadrature-amplitude modulated (QAM) signal integrity of a reflective modulator and an optical circulator coupled back-to-back and 25-kilometer apart, respectively, in accordance with an embodiment of the present disclosure.
Figure 3D:
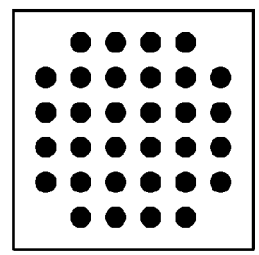

Please refer to FIGS. 3c and 3d with regard to FIG. 2. The two plots are evidence that the integrity of an optical signal between the reflective modulator 2421 and the optical circulator 2423 and modulated using quadrature amplitude modulation (QAM) is upheld whether they are coupled back-to-back (FIG. 3c) or 25-kilometer apart (FIG. 3d).

It can be concluded from the comparisons in FIG. 3b and between FIGS. 3c and 3d that the present disclosure is applicable not only to signal transmission in data centers, but also to longer-distance communication in passive optical networks (PON) or radio-over-fiber systems.

The present disclosure is summarized thus: An individual control signal is transmitted to facilitate data transmission between a pair of servers and received by the control component of the carrier processing unit as part of an aggregate control signal. Based on the individual control signal, the control component adjust a light path within the optical switch to guide a carrier having the wavelength required by the receiving server to the corresponding modulating unit, which modulates the carrier and the data signal into an optical signal. Through aggregation by the optical coupler and separation by the wavelength-division demultiplexer, the optical signal is sent to the corresponding demodulating unit, which demodulates it into the data signal arriving at the intended server.

What is claimed is:

1. A terminal device with optical routing based on dynamic wavelength assignment, the terminal device comprising:
    a plurality of servers, each of which is adapted for generating an individual control signal and a data signal, the individual control signals forming an aggregate control signal;
    a modulation module comprising:
        an optical coupler; and
        a plurality of modulating units in one-to-one correspondence with the servers, each of the modulating units adapted for receiving the data signal from the corresponding server; and
    a wavelength selection module comprising:
        a multi-wavelength light source for generating an input carrier having a plurality of wavelengths; and
        a carrier processing unit for separating the input carrier into a plurality of carriers and for guiding the carriers corresponding to the servers to the corresponding modulating units based on the aggregate control signal;
    wherein each of the carriers has one of the wavelengths, each of the modulating units is further adapted for modulating the carrier guided to the modulating unit into an optical signal based on the received data signal, and the optical coupler is adapted for aggregating the optical signals into an aggregate optical signal.

2. The terminal device of claim 1, wherein the carrier processing unit comprises:
    a wavelength-division demultiplexer for separating the input carrier into the carriers;
    a control component for receiving the aggregate control signal; and
    an optical switch for guiding the carriers corresponding to the servers to the corresponding modulating units based on the received aggregate control signal.

3. The terminal device of claim 2, wherein the wavelengths are different from one another.

4. The terminal device of claim 2, wherein the wavelength-division demultiplexer is an arrayed waveguide grating.

5. The terminal device of claim 1, wherein each of the modulating units is an external modulator.

6. The terminal device of claim 5, wherein the external modulator is an electro-absorption modulator or a Mach-Zehnder modulator.

7. The terminal device of claim 1, wherein each of the modulating units comprises:
   a reflective modulator; and
   an optical circulator having a first port, a second port, and a third port, the first port adapted for receiving the carrier from the carrier processing unit and for guiding the carrier to the reflective modulator through the second port;
   wherein the reflective modulator is activated upon receiving the carrier, the activated reflective modulator adapted for modulating the received carrier into the optical signal based on the received data signal;
   wherein the second port is adapted for guiding the optical signal to the optical coupler through the third port.

8. The terminal device of claim 1, further comprising a receiving apparatus for separating the aggregate optical signal into the optical signals, for demodulating the separated optical signals into the data signals, and for transmitting the demodulated data signals to the corresponding servers based on the wavelengths of the optical signals.

9. The terminal device of claim 8, wherein the receiving apparatus comprises:
   a wavelength-division demultiplexer for separating the aggregate optical signal into the optical signals; and
   a plurality of demodulating units in one-to-one correspondence with the servers, for demodulating the separated optical signals into the data signals, and for transmitting the demodulated data signals to the corresponding servers based on the wavelengths of the optical signals.

10. An optical router based on dynamic wavelength assignment and for receiving a plurality of data signals and an aggregate control signal from a plurality of servers, the optical router comprising:
    a modulation module comprising:
      an optical coupler; and
      a plurality of modulating units in one-to-one correspondence with the servers, each of the modulating units adapted for receiving the data signal from the corresponding server; and
    a wavelength selection module comprising:
      a multi-wavelength light source for generating an input carrier having a plurality of wavelengths; and
      a carrier processing unit for separating the input carrier into a plurality of carriers and for guiding the carriers corresponding to the servers to the corresponding modulating units based on the aggregate control signal;
    wherein each of the carriers has one of the wavelengths, each of the modulating units is further adapted for modulating the carrier guided to the modulating unit into an optical signal based on the received data signal, and the optical coupler is adapted for aggregating the optical signals into an aggregate optical signal.

11. The optical router of claim 10, wherein the carrier processing unit comprises:
    a wavelength-division demultiplexer for separating the input carrier into the carriers;
    a control component for receiving the aggregate control signal; and
    an optical switch for guiding the carriers corresponding to the servers to the corresponding modulating units based on the received aggregate control signal.

12. The optical router of claim 11, wherein the wavelengths are different from one another.

13. The optical router of claim 11, wherein the wavelength-division demultiplexer is an arrayed waveguide grating.

14. The optical router of claim 10, wherein each of the modulating units is an external modulator.

15. The optical router of claim 14, wherein the external modulator is an electro-absorption modulator or a Mach-Zehnder modulator.

16. The optical router of claim 10, wherein each of the modulating units comprises:
    a reflective modulator; and
    an optical circulator having a first port, a second port, and a third port, the first port adapted for receiving the carrier from the carrier processing unit and for guiding the carrier to the reflective modulator through the second port;
    wherein the reflective modulator is activated upon receiving the carrier, the activated reflective modulator adapted for modulating the received carrier into the optical signal based on the received data signal;
    wherein the second port is adapted for guiding the optical signal to the optical coupler through the third port.

17. A terminal device with optical routing based on dynamic wavelength assignment, the terminal device comprising:
    a plurality of serving modules, each of which comprises a reflective modulator and a server adapted for generating an individual control signal and a data signal, the individual control signals forming an aggregate control signal;
    a guiding module comprising an optical coupler and a plurality of optical circulators in one-to-one correspondence with to the serving modules; and
    a wavelength selection module comprising:
      a multi-wavelength light source for generating an input carrier having a plurality of wavelengths; and
      a carrier processing unit for separating the input carrier into a plurality of carriers and for guiding the carriers corresponding to the servers to the corresponding optical circulators based on the aggregate control signal, each of the carriers having one of the wavelengths;
    wherein each of the optical circulators has a first port, a second port, and a third port, the first port adapted for receiving the carrier from the carrier processing unit and for guiding the carrier to the reflective modulator through the second port;
    wherein the reflective modulator is activated upon receiving the carrier, the activated reflective modulator adapted for modulating the received carrier into an optical signal based on the data signal;
    wherein the second port is adapted for guiding the optical signal to the optical coupler through the third port, and the optical coupler is adapted for aggregating the optical signals into an aggregate optical signal.

* * * * *